US005947016A

United States Patent [19]

Repac et al.

[11] Patent Number: 5,947,016

[45] Date of Patent: Sep. 7, 1999

[54] GARLIC CUTTER

[75] Inventors: Cedomir Repac, Brechen, Germany; Branko Culig, Gradac, Slovenia

[73] Assignee: Petra Repac, Brechen, Germany

[21] Appl. No.: 09/146,756

[22] Filed: Sep. 4, 1998

[30] Foreign Application Priority Data

Feb. 13, 1998 [DE] Germany .......................... 198 05 933

[51] Int. Cl.[6] .............................. A47J 17/00; A23L 1/00; A23L 1/212; A23P 1/00

[52] U.S. Cl. .......................... 99/538; 83/437.2; 83/437.4; 83/451; 83/932; 99/543; 99/545

[58] Field of Search ............................. 99/537, 538–545, 99/547, 555, 556, 588, 643; 83/862, 431, 865, 857, 425.3, 425.7, 620, 932, 437.1, 437.2, 437.4, 451, 407; 30/113.1, 114; 426/302

[56] References Cited

U.S. PATENT DOCUMENTS

| | | | |
|---|---|---|---|
| 343,840 | 6/1886 | Opp | 83/437.4 |
| 533,703 | 2/1895 | Callahan | 83/437.4 |
| 2,500,973 | 3/1950 | Ackerman | 83/932 X |
| 4,095,518 | 6/1978 | Jones | 99/538 |
| 4,436,025 | 3/1984 | Jones | 99/537 X |
| 4,569,280 | 2/1986 | D'Ambro et al. | 83/451 X |
| 5,121,679 | 6/1992 | Mertz | 99/538 |
| 5,216,031 | 6/1993 | Dobson et al. | 99/584 X |
| 5,271,317 | 12/1993 | Aguerrevere et al. | 99/538 |
| 5,337,480 | 8/1994 | Codikow | 30/114 |
| 5,363,756 | 11/1994 | Muro | 99/537 X |
| 5,375,512 | 12/1994 | Ertmer | 99/538 |
| 5,421,249 | 6/1995 | Repisky et al. | 99/545 |

*Primary Examiner*—Timothy F. Simone
*Attorney, Agent, or Firm*—Liniak, Berenato, Longacre & White

[57] ABSTRACT

A garlic cutter comprising a housing bearing a cutting blade (8) at its underside and further comprising an upper part (2) with a punch (12) affixed thereto. The upper part when in the operational state and during rotation relative to the housing (6) carries out an axial displacement relative to the co-rotating cutting grid (**5*b*). In order to achieve speed in operation following filling of the garlic cutter, so that the latter gently mince the fruit and also be rapidly reopenable and cleanable, an inner structure (7) receiving the garlic is rotatably supported in the housing (6) and comprises a cutting grid (5*b*) entered by the punch (12) mounted to a spindle (4). A coupling nut (3) can be mounted on the housing (6), that in the operational state assure engagement with the spindle (4) and that in the open state allows longitudinal displacement of the spindle (4**).

11 Claims, 9 Drawing Sheets

GARLIC CUTTER

BACKGROUND OF THE INVENTION

1. Filed of the Invention

The invention concerns a garlic cutter which may also be used for other vegetables, for instance onions.

2. Description of the Prior Art

Known implements for mincing garlic are designed as a sort of press, the garlic being forced by a punch through a grid opening. Essentially the vegetable is being squeezed, namely being processed by the apertures, into small strands or streamers. The garlic is less cut than pressed in this procedure. Moreover, comparatively large parts remain caught in the implement and do not pass through the apertures.

The German Offenlegungsschrift 21 19 992 describes an onion cutter wherein an axially adjustable punch forces the onion through star-arrayed cutting blades, so that the onion is cut into a plurality of sectors of a circle. These sectors are cut into individual pieces by a knife inserted transversely to them.

A similar onion cutter designed with cutting wires rotating relative to the onion is disclosed in the German Gebrauch-smuster 1,750,135.

The German patent 832,051 discloses an implement for mincing onions, fruit or other goods and comprising a housing bearing a cutting blade at its lower side and an upper part fitted with a punch affixed thereto. The punch during operation, and rotation relative to the housing, carries out an axial motion toward the co-rotating cutting grid. By means of this axially displaceable punch, the fruit is moved or pressed through a co-rotating cutting grid at the output side of which are formed corresponding streamers or strands of square cross-section. These segments then are longitudinally minced by the blade mounted behind the cutting grid and consequently onion cubes are made. The fruit is neither pressed nor rubbed. Rather, the onion on one hand is cut by the grid and on the other hand is cut transversely by the blade, and as a result there are finely cut onion cubes as end products. The cutting grid cuts the fruit in two dimensions, and therefore, pins or bars are generated which subsequently are minced by the blade into cubes. The punch is designed in such manner that its front side shape matches the shape of the two-dimensional cutting grid, that is the front-side shape consists of a number of pegs pushing the onion segments through the cutting grid. The blade is mounted in stationary manner on the housing, whereas the punch and the cutting grid are mounted rotatably and preferably so that one actuating element can set both in rotation and that, by means of the spindle, they generate an axial punch motion relative to the co-rotating cutting grid.

A drawback of the above implement is that because of the comparatively fine thread, after the fruit has been inserted, the lid must be rotated fairly long "on empty" until the punch comes to rest against said fruit. The actual cutting or pressing procedure begins only then. Again opening requires unscrewing the upper part in time-consuming manner. Furthermore, the punch of this state of the art consists of a plurality of pegs and presents difficulties in cleaning.

The objective of the invention is a garlic cutter, or such a cutter for vegetables which, following filling, shall operate more rapidly, further shall mince the fruit without damaging it, and also shall be quickly opened and cleaned.

This problem is solved in the invention by the garlic cutter of the present invention.

SUMMARY OF THE INVENTION

The garlic cutter of the present invention comprises an inner structure receiving the garlic and rotatingly supported in the housing containing the cutting grid and entered by the spindle-borne punch. The cutter further comprises a means to ensure spindle engagement during operation and allowing longitudinal displacement of the spindle in an open phase. Such may be accomplished by appropriate mechanisms which can be converted from a clamped state or from the engagement between a mating thread and the spindle into a loosened state, for instance being plastic or metal detent elements. In a preferred embodiment, a coupling nut which can be mounted on the housing and, by being rotated, will drive elements to engage or release the spindle.

The invention makes use of these two different states so that, during operation, the spindle thread during the rotation of the upper part shall gently but firmly force the fruit against the cutting grid and, in the open state, when the mating thread for the spindle no longer is engaged, the spindle can be quickly shifted relative to the nut or can be ratcheted over the spindle thread. As a result the insertion of the upper part on the lower part, and the removal of the upper part from the lower part, can be carried substantially faster than heretofore. Laborious turning through the full thread is not necessary. Using the preferred coupling nut, the spindle can be mounted in any desired position on the lower part. By means of the fast stopping action of the coupling nut, the spindle can be clamped in any position, thereby arriving at the operational position to cut the garlic.

The above design substantially facilitates handling the garlic cutter. First the garlic clove is inserted into the lower part, then the upper part with threaded rod (spindle), coupling nut and punch are inserted into the lower part. Contrary to the case of the state of the art, in this embodiment of the invention the upper part need not be completely screwed-in over the very fine thread of the threaded rod until the punch rests on the garlic cloves or presses against them. Instead the upper part with threaded spindle can be ratcheted through the coupling nut until the punch comes to rest on the material to be pressed. Thereupon the coupling nut is moved into the operational, that is, locked position with the lower part and thus the garlic cutter is now ready to cut. Then the upper part is rotated and thereby the threaded spindle on account of the mating thread driven by the coupling nut engages the lower part and effects the axial displacement besides the cutting of the garlic clove.

Again the invention accelerates substantially the opening time of the garlic cutter. The user need only detach the coupling nut, preferably from its bayonet lock, to release the thread from the spindle. Then the spindle together with the coupling nut can be pulled out.

The cutting blade is affixed at the lower housing sides to a bridge resting on opposite positions of the housing. Advantageously the blade shall not extend beyond the middle of the cutting grid, rather being somewhat narrower. Otherwise, the center would always be covered by the blade, whereby the garlic strands might accumulate on the blade or its tip and entail malfunction.

In a preferred embodiment of the invention, the mating surface for the spindle is present at or inside the coupling nut. This design is a simple embodiment variation requiring only few parts.

Preferably the coupling nut is affixed by a bayonet lock to the housing. For that purpose the housing is fitted preferably with toes projecting above some peripheral parts while the other parts remain clear. In this manner the coupling nut is easily deposited and then can be locked in known manner by a short rotation, for instance by a quarter or third of a turn. Other locking means, for instance by screwing onto its own thread or by being plugged into mating parts, are also feasible.

In a preferred embodiment of the invention, the mating thread inside the coupling nut is located on the inside of a retaining ring which during the operational phase is pressed against the spindle and is removed from it in the open state. Accordingly, the alternation of the states “operation” and “open” takes place automatically by rotating the coupling nut on the lower housing part—preferably directly when being screwed tight into the bayonet lock. Malfunctions are averted thereby. This embodiment may be implemented in simple manner in that at one of the parts, for the instance the lower part, several (and for instance three) toes are arrayed over the circumference and increase in thickness in the circumferential direction, so that, following the tightening rotation of the coupling nut, the retaining ring will slide over the oblique planes and in the process will be pressed inward by the increasing thickness of the toes and thus also be pressed against the spindle thread. Most appropriately the sliding surfaces may be formed at the projections of the bayonet locks used to hold the coupling nut. The projecting elements then have two functions, namely to hold and lock the coupling ring on one hand, and on the other to push together the retaining ring of which the mating thread is pushed into the spindle thread, the operational state then having been reached.

In another preferred embodiment of the invention, the inner structure rotating inside the housing is made easily extractable for cleaning purposes. Preferably the inner structure is detented by ratcheting elements into the outer housing to facilitate removal and cleaning by merely pressing from below against the cutting grid or its frame. In this manner the user can easily take out the inner structure and then clean the cutting grid.

In another embodiment, the cutting grid is easily detachable from the inner structure. The connection of the two parts is by geometrically locking studs allowing the two parts to collapse and thereby easy disassembly. Cleaning the cutting grid is further simplified as a result. Moreover, this embodiment, with removable inner structure, also allows easy access to clean the housing and the blade.

In a further embodiment of the invention, the blade holder together with the blade can be made detachable from the housing to facilitate cleaning both parts. In the simplest case the two parts are connected by a bayonet lock so configured that in operation the reaction pressure acting on the blade biases the blade holder toward the closed position. When designed for right-handed persons, the garlic cutter will have a right-handed thread, and therefore the upper part shall be rotated to the right relative to the lower part in order to press the vegetable against the cutting grid. The bayonet lock, holding the blade holder against the housing holder, is preferably designed in such manner that it will be open by a leftward rotation and closed by a rightward rotation. In this manner accidental opening during cutting will be prevented.

In this kind of garlic cutter the inner structure when in operation will rotate relative to the housing holding it. The drive to rotate the inner structure together with the punch can be implemented either by giving the punch a non-circular cross-section with which to dip into a correspondingly shaped cavity, or also and in a preferred way, by fitting punch guide-channels into the inner structure while guide toes are fitted to the punch to enter said channels. When the punch and the inner structure are symmetrical, assembly can be carried out in diverse positions. In the case of an asymmetric configuration, the assembly can take place only in a single configuration. Preferably the punch shall be rectangular to provide four different but wholly equivalent assemblies of punch and inner structure.

In another embodiment of the invention, the upper part of the garlic cutter comprises a limit stop which prevents a further rotation during the operational phase if the punch already has reached all the way down to the cutting grid. Further axial motion of the punch relative to the cutting grid is no longer desired especially when the punch pegs already dip into the holes of the cutting grid. In that case such a limit stop prevents further rotation of the upper part relative to the lower part or relative to the coupling nut. In the simplest design, two plastic channels are present at the inside of the upper part and cooperate with corresponding studs or bosses at the top side of the coupling nut and prevent further rotation to save the punch from undue stresses.

In a further embodiment, the limit stop at the upper part may be such that when unscrewing the fully screwed-in punch, for instance by a quarter turn, said stop drives the coupling nut and thus opens it. The opening of the garlic cutter is substantially facilitated thereby. By a mere rotation of the upper part, a drive motion is again imparted for instance by the cams or bosses also acting as limit stops against excessive penetration to the coupling nut, whereby the entire upper part, that is coupling nut plus upper part, can be removed following approximately one quarter turn. The advantage offered by this variation is that opening requires merely one grip and that the coupling nut need no longer be rotated additionally.

Another innovation of the invention especially appropriate for the described garlic cutter, though it also may be used per se elsewhere, consists of the punch pressing the garlic clove through the blade. This punch comprises a plurality of pegs which may reach as far as into the apertures of the cutting grid and which preferably are planar at the front, and it further comprises a front plate resiliently seated on the punch and covering the pegs, as a result of which the plate together with the front sides of the pegs form a closed punch surface. Preferably the front plate is fitted with as many boreholes as the punch comprises pegs. A single peg passes through each borehole. An essentially smooth surface is formed in the initial position or until the end of the punch's advance motion to the cutting grid. When during cutting of the garlic clove and during the advance motion the punch plate has been advanced as far as the cutting grid, then upon a further advance the pegs shall be pushed through the boreholes in the plate and pass through the cutting grid in order to fully press the garlic through said grid. In one embodiment compression springs are present between the perforated plate and the pegs and return the plate into its initial position when the pressure is relieved, thereby again implementing the substantially closed punch surface. The closed punch surface on one hand ensures complete mincing of the garlic by widely precluding garlic residues from remaining in any cavities and on the other hand the ability to clean especially rapidly the smooth lower surface of the punch.

Further objectives, advantages, features and applications of the present invention are elucidated in the following description of an illustrative embodiment and in relation to the drawing. All described and/or pictorially shown features represent the objective of the invention whether per se or in arbitrary combination, regardless of their summarization in the claims or the claims' mutual relationships.

DETAILED DESCRIPTION OF THE PREFERRED EMBODIMENT

Figure 1:
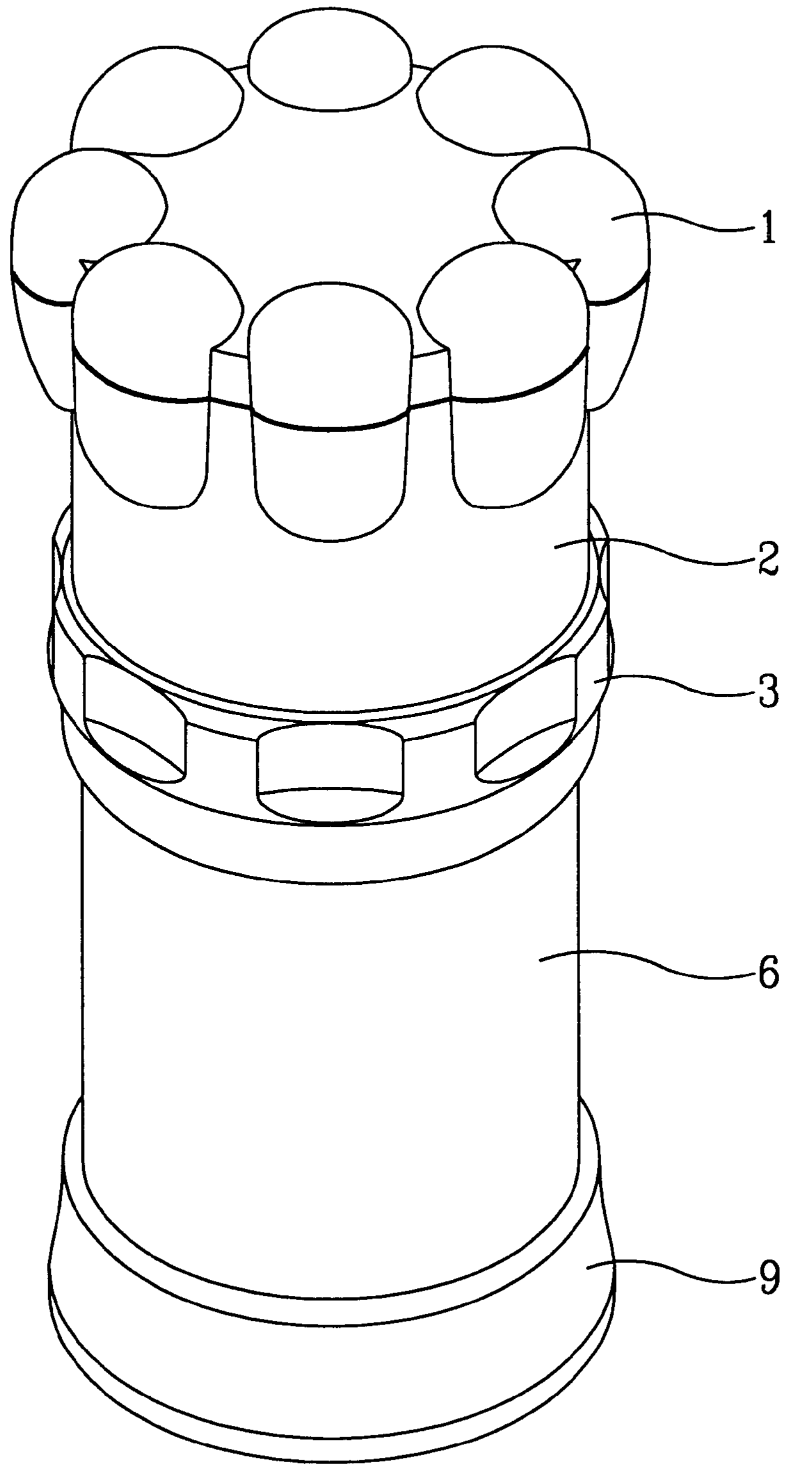
FIG. 1 is a general view of an embodiment of the invention of a garlic cutter.

The garlic cutter of FIG. 1 shows a grip 1 having several gripping troughs to better transmit the manually applied force of rotation. The grip 1 is seated on the upper part 2 and is rotatable relative to the housing 6. The coupling nut 3 is affixed to the top of the housing 6. At the bottom, the housing 6 merges into the cutting-blade holder 9. This holder is widened to form a better rest surface. The coupling nut 3 also comprises troughs to assure good handling.

Figure 2:
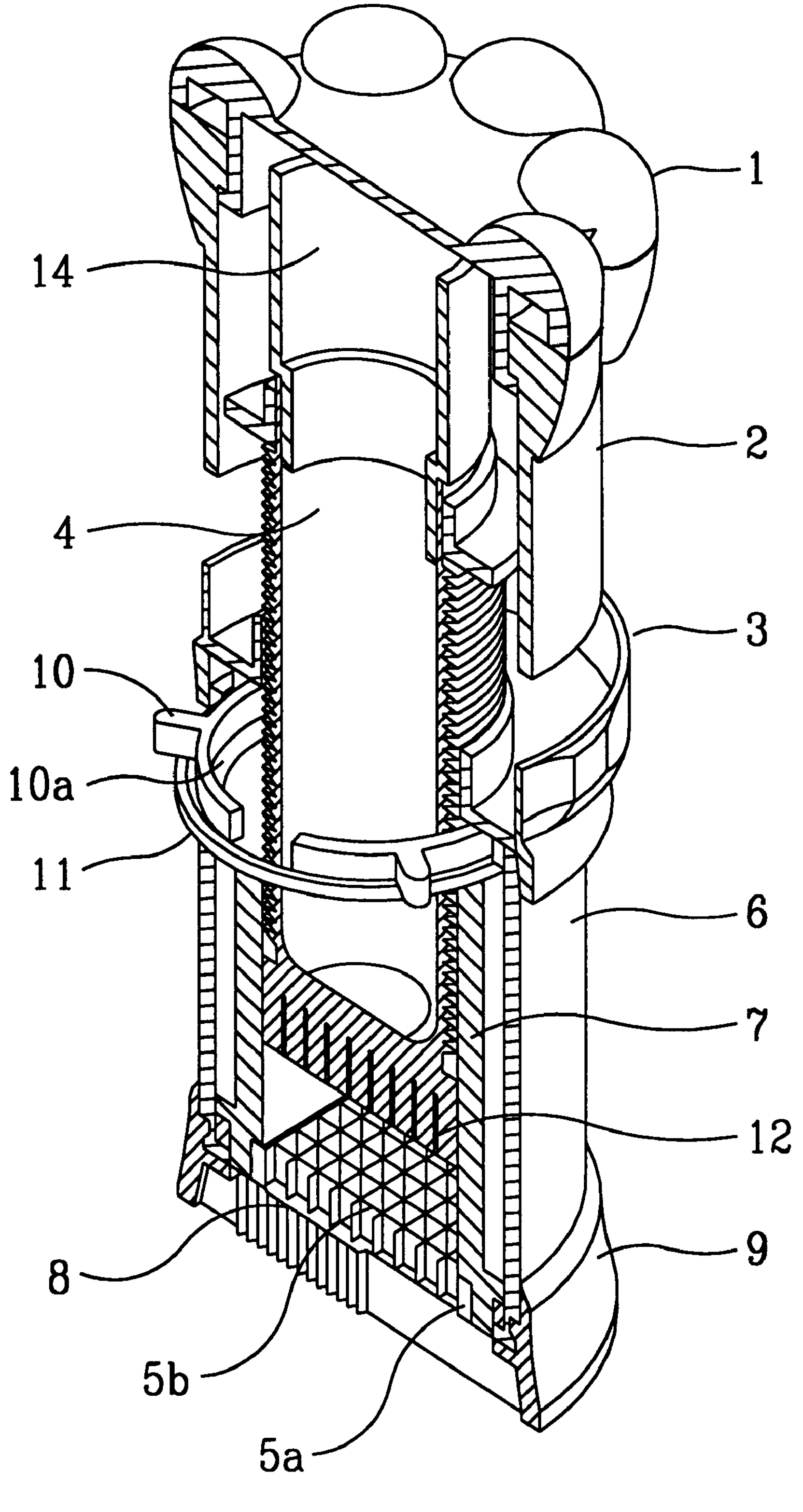
FIG. 2 is a sectional perspective of the embodiment of FIG. 1.

FIG. 2 is a perspective section of the inner design of the garlic cutter. It shows the grip 1, the upper part 2 and the punch 12 affixed therein and mounted by means of the spindle 4 on the upper part 2. These components form one unit. Essentially the lower cutter part consists of the housing 6 with a resting surface in the form of the blade holder 9 with a widened base and with the coupling nut 3 screwed onto it at the top. The inner ring 7 inside the housing 6 rests on an omitted metal ring acting as a slider. The inner structure 7 also is driven in rotation with the upper part 2. The cutting grid 5*b* affixed to the frame 5*a* is located at the lower end of the inner structure 7 and also will rotate when the punch 12 is rotated. On the other hand the blade holder 9 together with the blade 8 is stationary relative to the housing 6. A retaining ring 10 is mounted in the coupling nut 3 and in turn is held by the holding ring 11 inside the coupling nut 3.

FIG. 2 shows the garlic cutter of the invention in its open state, that is the coupling nut 3 is only deposited on the housing 6 but not yet engaged. For that reason the retaining ring 10 is still open while its inside, fitted with a portion of a mating thread, as yet is not pressed against the thread of the spindle 4. As a result the upper part 2 can be pulled through the retaining spring 10 without engaging it. The operational state is attained when the coupling nut 3 is engaged, that is pressed against the housing 6, whereby the retaining ring 10 is compressed and its thread 10*a* engages that of the spindle 4. When thereupon the grip 1 is rotated together with the upper part 2, the spindle 4 slowly threads its way downward against the retaining ring 10 and presses the garlic located below the punch 12 and above the cutting grid 5*b* through this grid. This action produces fine garlic bars in the cutting grid, the bars being cut into small parallelipipeds by the blade 8 during the rotation of the cutting grid 5*b*.

To open and take the garlic cutter apart, the coupling nut 3 again is rotated by a slight angle to release the retaining ring 10, whereupon the thread 10*a* no longer engages the thread of the spindle 4 and hence this spindle is easily pulled out of the lower part or housing 6. Preferably the coupling nut is kept captive at the spindle 4 between the grip 1 and the punch 12.

Figure 3:
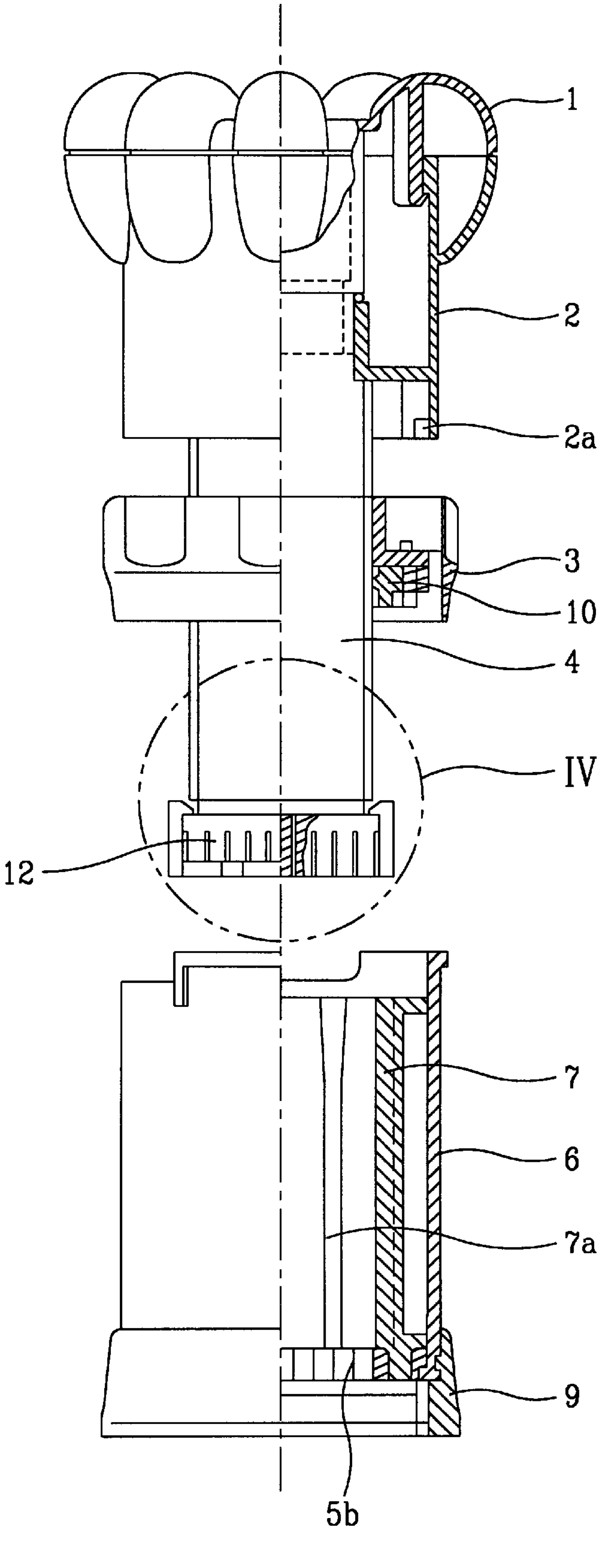
FIG. 3 shows the embodiment of FIG. 1 in the open state.

FIG. 3 shows the garlic cutter in the open state. The upper part 2 consists of the grip 1, the upper part 2 with spindle 4 and punch 12, the coupling nut 3 being loosely present on the spindle 4 which it does not yet engage. The lower part shows the housing 6, the inner structure 7 with guide channels 7*a* and the cutting grid 5*b*; further the blade holder 9. The upper part 2 shows a section of the limit stop 2*a* which, when the upper part 2 almost comes to rest on the coupling nut 3 after the spindle 4 has been wholly threaded down, so cooperates with a corresponding boss or stud inside the coupling that it precludes mutual or further rotation. This feature prevents the punch 12 from being excessively pressed into the cutting grid 5*b*.

The retaining ring 10 is shown in the open state inside the coupling nut 3, that is, it is expanded outward and as a result its inwardly acting thread does not engage the thread of the spindle 4. Thereby the coupling nut 3 is easily moved in either direction across the spindle 4.

Figure 2A:
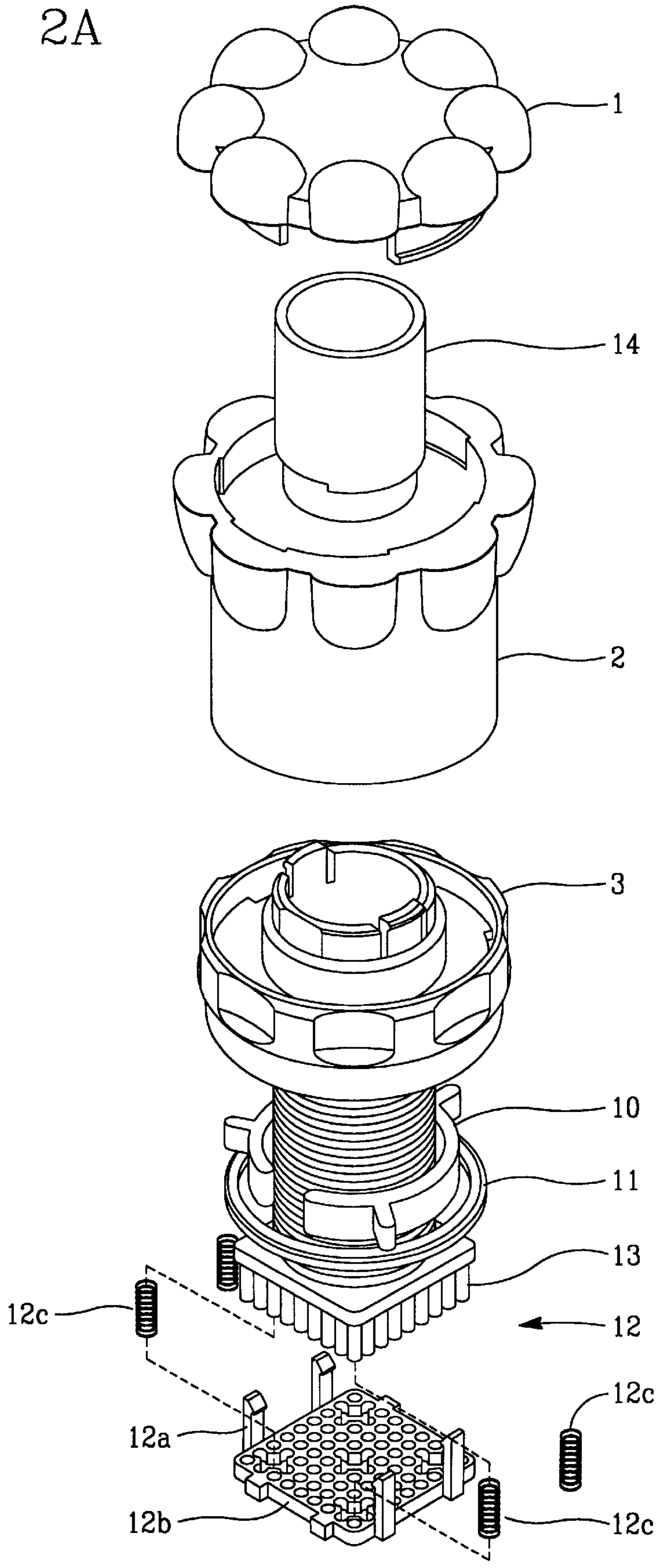
FIG. 2*a* is a perspective exploded view of part of the garlic cutter.
Figure 4:
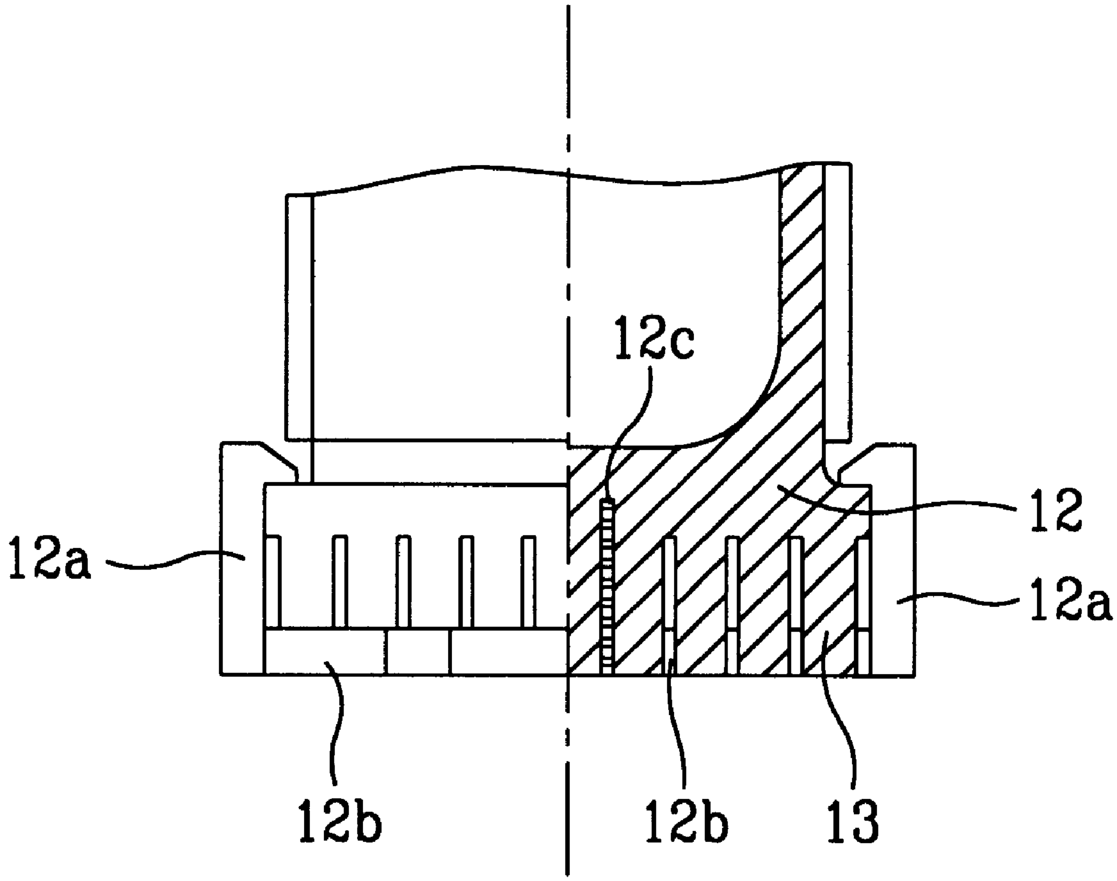
FIG. 4 shows a detail of FIG. 3.

As shown in FIGS. 2*a* and 4, the punch 12 comprises a plurality of pegs 13 associated with a plate 12*b* containing as many apertures as there are pegs 13. The plate 12*b* is affixed by four clamps 12*a* to the punch 12*c*. Four springs 12*c* repel the plate 12*b* from the punch 12. The plate 12*b* is stopped by the grid only at the end of pressing when it impacts the omitted cutting grid 5*b*, and then is pushed against the punch 12. The springs 12*c* are compressed, and the pegs 12 begin projecting beyond the plate 12*b*. These pegs pass through the apertures of the cutting grid 5*b* and thereby also push the last garlic remnants through the grid against the blade 8 rotating underneath. In this compressed final state, the top-side hooks of the clamps 12*a* are detached from the punch 12. If the user opens the garlic cutter or rotates the punch 12 upward again, then the springs 12*c* will press the plate 12*b* in the downward direction and as a result a practically planar surface constituted by the plate 12*b* and the front sides of the pegs 13 is created.

Figure 5:
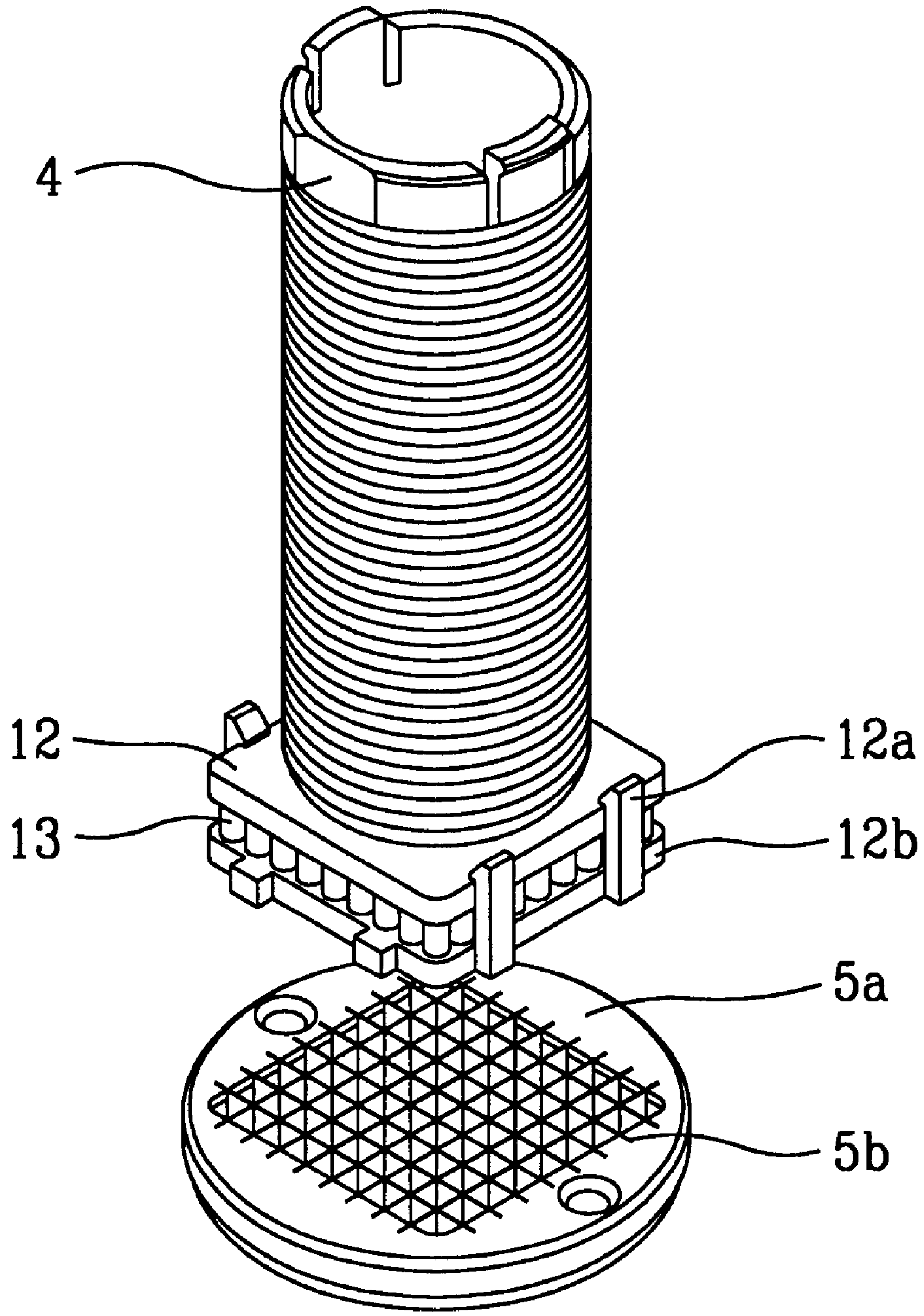
FIG. 5 is a detailed view of a punch and cutting grid of the garlic cutter.

FIG. 5 is another top view of this embodiment of the punch of the invention. It shows the punch 12 again affixed to the spindle 4 and comprising the pegs 13, which in this design are round, and the plate 12*b* with the matching apertures. The plate 12*b* is affixed by the clamps 12*a* to the punch 12 and is forced downward by the omitted springs, for instance five springs mounted above five pegs 13. The number of apertures in the cutting grid 5*b* is also the number of pegs 13.

Figure 6A:
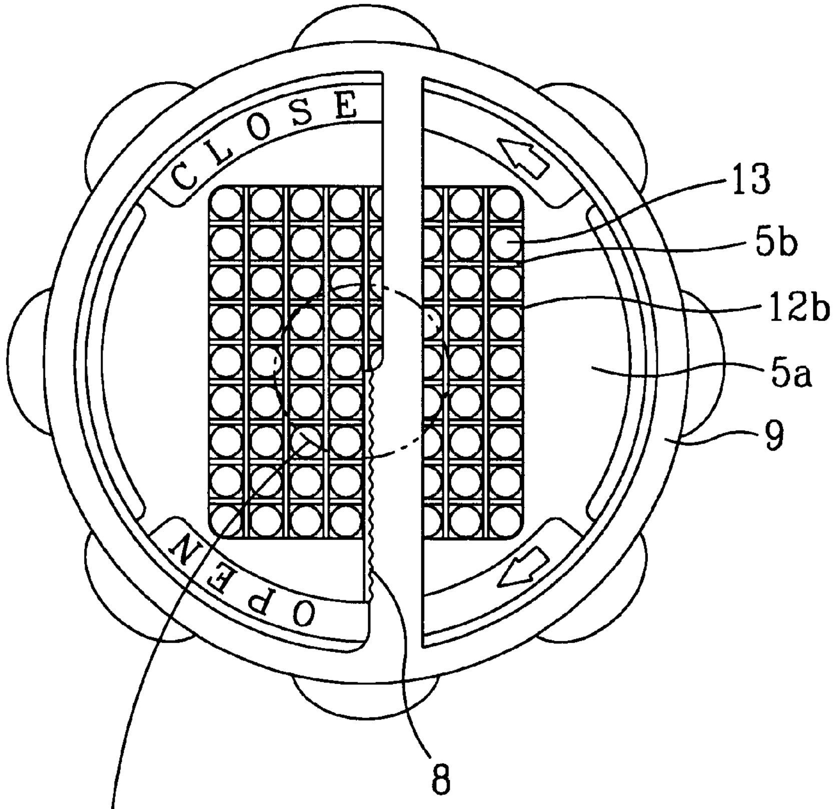
FIG. 6*a* is a view from below of a cutter of the invention.

FIG. 6*a* is a view from below of the closed garlic cutter. The blade holder 9 is mounted by a bayonet lock (here being left-handed for opening) on the housing 6. The cutting blade holder 9 comprises a bridge mounted somewhat off the cutter's center and fitted with the blade over approximately half its length. In operation, this blade 8 will be stationary while the cutting grid 5*b* together with the punch 12 rotates about the blade 8. This Figure also shows the pegs 13, the plate 12*b* and the frame 5*a* for the cutting grid 5*b*.

Figure 6B:
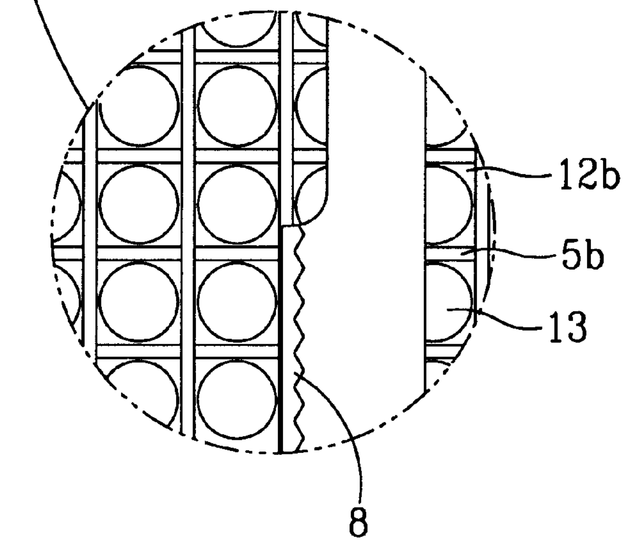
FIG. 6*b* is a detailed view of the detail H of FIG. 6*a,*

FIG. 6*b* shows an enlarged detail of the above cutter, in particular both the blade 8 and the cutting grid 5*b*. Also the pegs 13 and the plate 12*b*.

Figure 7A:
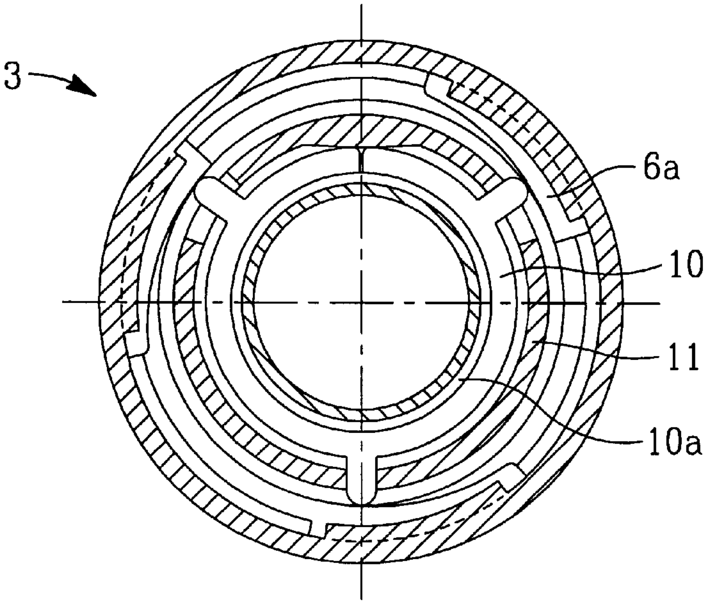
FIGS. 7*a*, 7*b* are two sections of a coupling nut.
Figure 7B:
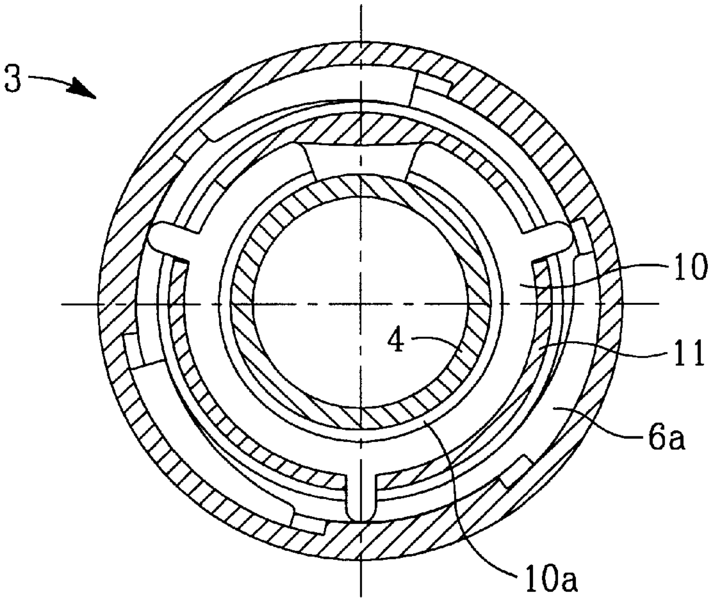

FIGS. 7*a* and 7*b* are two sections of the cutter of the invention at the level of the coupling nut 3. The upper partial view 7*a* shows the coupling nut 3 in the operational state. The coupling nut 3 is latched with the bayonet lock at the housing 6 of which the toes 6*a* are shown. These toes are designed to have circumferentially increasing thicknesses, whereby, when the coupling nut 3 is rotating relative to the housing 6, the toes 6*a* shall act on correspondingly configured studs of the retaining ring 10 to force said studs inward against the spindle 4. As a result the thread 10*a* engages the thread of the spindle 4 and during the rotation phase causes up and down motion.

The partial FIG. 7*b* shows the coupling nut 3 in the released (open) state. The toes 6*a* no longer press against the corresponding protrusions of the retaining ring 10. Said spring has opened on account of its intrinsic elasticity and no longer forces its thread 10*a* into the thread of the spindle 4. Consequently the spindle 4 is easily removed from or inserted into the lower part of the garlic cutter.

Figure 8:
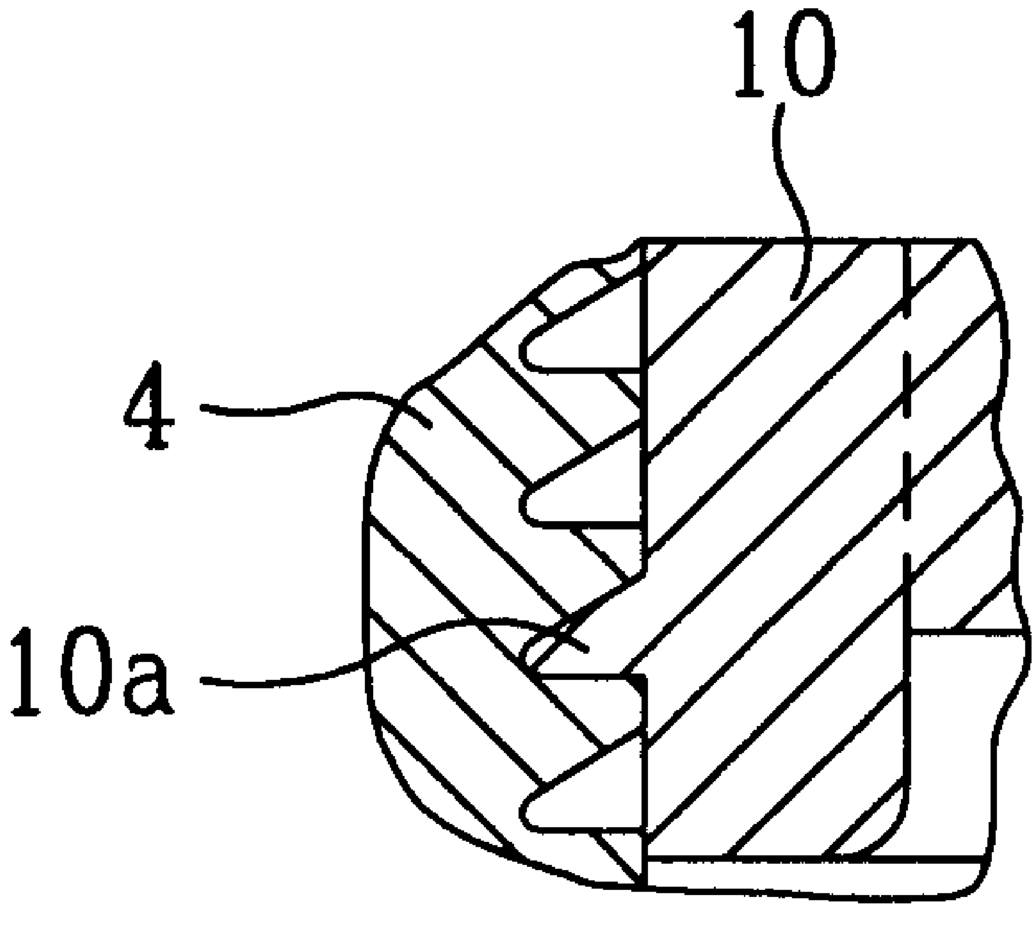
FIG. 8 is a detail of FIG. 2.

Lastly FIG. 8 shows another detail of FIG. 3, namely, in side section, the engagement of the thread 10*a* with the thread of the spindle 4 when the retainer ring 10 is pressed by inward forces against the spindle 4, that is when it is in the operational state.

We claim:

1. A garlic cutter comprising:

a housing bearing a cutting blade (8) at a lower part thereof;

an upper part (2) with a punch (12) affixed thereto, said upper part when in an operational state and during rotation relative to the housing (6) carries out an axial displacement toward a co-rotating cutting grid (5*b*);

an inner structure (7) adapted to receive garlic and rotatably supported in the housing (6), said inner structure having a cutting grid (5*b*), a punch (12) affixed to a spindle (4) together disposed within said inner structure, and a coupling means for coupling said inner structure and said housing, said coupling means operable between an open state and an operational state, wherein when in said open state allows free longitudinal displacement of said spindle and inner structure with respect to said housing and when in said operational state said coupling means engages said spindle to selectively permit longitudinal displacement of said spindle and inner structure with respect to said housing.

2. The Garlic cutter as claimed in claim 1, wherein, said coupling means comprises a coupling nut having threads engaging mating threads formed on said spindle.

3. The Garlic cutter as claimed in claim 2, wherein the coupling nut (3) is affixed by a bayonet lock to the housing (6).

4. The Garlic cutter as claimed in claim 3, wherein the mating thread is present at an inside portion of a retaining ring (10) which when said coupling means is in the operational state said retaining ring will be pressed against the spindle (4) and in the open state will be removed from this spindle.

5. The Garlic cutter as claimed in claim 4, wherein the inner structure (7) can be removed from said housing for cleaning purposes.

6. The Garlic cutter as claimed in claim 5, wherein the cutting grid (5*b*) is detachable from said inner structure to facilitate cleaning the inner structure (7).

7. The Garlic cutter as claimed in claim 6, wherein the cutting blade is detachable from said housing to allow cleaning the housing (6).

8. The Garlic cutter as claimed in claim 7, wherein the inner structure (7) is fitted with guide channels (7*a*) for guiding the punch (12).

9. The Garlic cutter as claimed in claim 8, wherein the upper part (2) is fitted with a limit stop (2*a*) limiting rotation of the upper part (2) thereby preventing punch pegs (13) attached to said upper part from do not excessively penetrating deeply into the cutting grid (5*b*).

10. The Garlic cutter as claimed in claim 9, wherein the limit stop (2*a*) which, when the upper part (2) is being removed, will automatically drive the coupling nut (3) during a state wherein the punch (12) is fully screwed-in.

11. The garlic cutter according to claim 1, wherein said punch comprises: a plurality of pegs (13) insertable into corresponding apertures of the cutting grid (5*b*) and by a plate (12*b*) resiliently seated on the pegs (13) whereby the plate (12*b*) together with the pegs (13) forms a closed punch surface.

* * * * *